(12) United States Patent
Liu et al.

(10) Patent No.: US 12,316,453 B2
(45) Date of Patent: May 27, 2025

(54) CONTROLLING UPLINK DUPLICATION IN PACKET DATA CONVERGENCE PROTOCOL LAYER

(71) Applicant: ZTE CORPORATION, Guangdong (CN)

(72) Inventors: Zhuang Liu, Shenzhen (CN); Zijiang Ma, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 259 days.

(21) Appl. No.: 17/848,960

(22) Filed: Jun. 24, 2022

(65) Prior Publication Data

US 2022/0329355 A1   Oct. 13, 2022

Related U.S. Application Data

(63) Continuation of application No. PCT/CN2020/105035, filed on Jul. 28, 2020.

(51) Int. Cl.
*H04L 1/08* (2006.01)

(52) U.S. Cl.
CPC ..................... *H04L 1/08* (2013.01)

(58) Field of Classification Search
CPC ......................................................... H04L 1/08
See application file for complete search history.

(56) References Cited

U.S. PATENT DOCUMENTS

| 2018/0367288 A1 | 12/2018 | Vrzic et al. |
| 2018/0376457 A1* | 12/2018 | Tseng ............... H04W 76/12 |
| 2019/0082363 A1* | 3/2019 | Park ................. H04W 24/10 |

FOREIGN PATENT DOCUMENTS

| CN | 108810990 A | 11/2018 |
| CN | 110072276 A | 7/2019 |
| CN | 110139397 A | 8/2019 |
| CN | 110771082 A | 2/2020 |
| EP | 3 589 067 A1 | 1/2020 |
| WO | WO-2019/139530 A1 | 7/2019 |
| WO | WO-2021/161433 A1 | 8/2021 |

OTHER PUBLICATIONS

Second Japanese Office Action on JP Appln No. 2022-540393, dated Mar. 25, 2024 (8 pages).
First Japanese Office Action on JP Appln No. 2022-540393, dated Oct. 2, 2023 (8 pages).
ZTE, "Consideration on PDCP UL duplication coordination for more than 2 RLC entities", 3GPP TSG RAN WG3 #107_e, R3-200259, e-Meeting, Feb. 14, 2020 (4 pages).

(Continued)

*Primary Examiner* — Duc C Ho
(74) *Attorney, Agent, or Firm* — Foley & Lardner LLP

(57) ABSTRACT

Presented are systems, methods, apparatuses, or computer-readable media for controlling uplink (UL) duplication. An assisting radio access network (RAN) node may receive, from a host RAN node hosting a packet data convergence protocol (PDCP) entity, radio link control (RLC) activation information associated with a dedicated radio bearer (DRB) for uplink duplication. The assisting RAN node may establish a medium control element (MAC) control element (CE) frame, according to the RLC activation information.

20 Claims, 10 Drawing Sheets

(56) References Cited

OTHER PUBLICATIONS

ZTE, "TP for Introduction of NR_IIOT support to TS 38.425) UL PDCP duplication", 3GPP TSG RAN WG3 #108-e R3-203177, e-Meeting, May 22, 2020 (10 pages).
3rd Generation Partnership Project, "Technical Specification Group Radio Access Network; NG-RAN; F1 application protocol (F1AP) (Release 16)", 3GPP TS 38.473, VI6.2.0, Jul. 16, 2020, Sophia-Antipolis Cedex, France (363 pages).
3rd Generation Partnership Project, "Technical Specification Group Radio Access Network; NG-RAN; NR user plane protocol (Release 16)", 3GPP Standard; Technical Specification; 3GPP TS 38.425, VI6.1.0, Jul. 16, 2020, Sophia-Antipolis Cedex, France (25 pages).
3rd Generation Partnership Project, "Technical Specification Group Radio Access Network; NR; Medium Access Control (MAC) protocol specification (Release 16)", 3GPP TS 38.321, VI6.1.0, Jul. 24, 2020, Sophia-Antipolis Cedex, France (151 pages).
CATT, "Summary of offline discussion on CB:# NRIIOT3-ULPDCPdup_ctrl" 3GPP TSG-RAN WG3 #108-e, R3-204180, Jun. 15, 2020, Sophia-Antipolis Cedex, France (22 pages).
CMCC, "Remaining issues of dynamic control" 3GPP TSG-RAN WG3 #108-e, R3-203901, Jun. 11, 2020, Online (4 pages).
Extended European Search Report for EP Appl. No. 20947561.5, dated Nov. 17, 2022 (13 pages).
ZTE, "(TP for Introduction of NR_IIOT support to 38.423): Supporting duplication for more than 2 RLC entities" 3GPP TSG-RAN WG3 #107-e, R3-200256, Mar. 6, 2020, e-Meeting (26 pages).
ZTE, "(TP for Introduction of NR_IIOT support to TS 38.425) UL PDCP duplication" 3GPP TSG-RAN WG3 #108-e, R3-203177, Jun. 12, 2020, Online (5 pages).
International Search Report and Written Opinion for PCT Appl. No. PCT/CN2020/105035, mailed Apr. 27, 2021 (9 pages).
ZTE: "Consideration on UL PDCP duplication" 3GPP TSG-RAN WG3 #108-e; R3-203174; Jun. 12, 2020; Online (7 pages).
First Office Action for CN Appl. No. 202080096115.9, dated Oct. 31, 2024 (with English translation, 13 pages).
Nokia et al., "Configuration and Control for Uplink PDCP Duplication", 3GPP TSG-RAN WG2 Meeting #108, R2-1915495, Nov. 22, 2019, Reno, NV, USA (4 pages).
Nokia et al., "MAC CE Format and Network Coordination for Uplink PDCP Duplication", 3GPP TSG-RAN WG2 Meeting #107bis, R2-1913094, Oct. 18, 2019, Chongqing, China (4 pages).
Nokia et al., "Network Coordination for Uplink PDCP Duplication", 3GPP TSG-RAN WG2 Meeting #108, R2-1915493, Nov. 22, 2019, Reno, NV, USA (3 pages).
Second Office Action for CN Appl. No. 202080096115.9, dated Jan. 23, 2025 (with English translation, 14 pages).
First Office Action for KR Patent Appln. No. 10-2022-7022114, dated Mar. 27, 2025 (9 pages, including English translation).
Huawei et al., "Resource efficient PDCP duplication: enhancement 3", 3GPP TSG RAN WG3 #107bis-e, R3-202904, e-Meeting, May 18, 2020 (7 pages).
Vivo, "Discussion on the Rel-15 PDCP duplication MAC CE", 3GPP TSG-RAN WG2 Meeting #109bis electronic, R2-2002776, e-Meeting, Apr. 10, 2020 (4 pages).

* cited by examiner

CONTROLLING UPLINK DUPLICATION IN PACKET DATA CONVERGENCE PROTOCOL LAYER

CROSS-REFERENCE TO RELATED APPLICATION

This application claims the benefit of priority under 35 U.S.C. § 120 as a continuation of PCT Patent Application No. PCT/CN2020/105035, filed on Jul. 28, 2020, the disclosure of which is incorporated herein by reference in its entirety.

TECHNICAL FIELD

The disclosure relates generally to wireless communications, including but not limited to systems and methods for controlling uplink (UL) duplication.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. An assisting radio access network (RAN) node may receive, from a host RAN node hosting a packet data convergence protocol (PDCP) entity, radio link control (RLC) activation information associated with a dedicated radio bearer (DRB) for uplink duplication. The assisting RAN node may establish a medium control element (MAC) control element (CE) frame, according to the RLC activation information.

In some embodiments, the RLC activation information may be determined by the host RAN node and includes information on secondary RLC entities that are in at least one of active state or inactive state.

In some embodiments, the assisting RAN node may send, to the host RAN node in an uplink packet, first information comprising at least one of: radio quality information of RLC entities at the assisting RAN node, or an identification of suggested RLC entities at the assisting node for the uplink duplication. The RLC activation information may be determined by the host RAN node according to the first information.

In some embodiments, the RLC activation information may include information on secondary RLC entities that are in at least one of active state or inactive state in all RAN nodes other than the assisting RAN node.

In some embodiments, the assisting RAN node may determine information on secondary RLC entities that are in at least one of active state or inactive state in the assisting RAN node for uplink duplication. In some embodiments, the assisting RAN node may send, to the host RAN node in an uplink packet, first information comprising at least one of: radio quality information of RLC entities at the assisting RAN node, or the information on secondary RLC entities that are in at least one of active state or inactive state in the assisting RAN node for uplink duplication.

In some embodiments, the assisting RAN node may send, from the host RAN node, the RLC activation information via a downlink packet. In some embodiments, when the RLC activation information includes information of all secondary RLC entities of the DRB, the assisting RAN node may incorporate the RLC activation information into the MAC CE frame.

In some embodiments, when the RLC activation information only includes information of secondary RLC entities that are in at least one of active state or inactive state in all RAN nodes other than the assisting RAN node, the assisting RAN node may determine information of secondary RLC entities that are in at least one of active state or inactive state in the assisting RAN node. The assisting RAN node may combine the information of secondary RLC entities that are in at least one of active state or inactive state in the assisting RAN node and the information of secondary RLC entities that are in active state or inactive state in other RAN nodes for the DRB, into combined information. The assisting RAN node may incorporate the combined information into the MAC CE frame.

In some embodiments, the assisting RAN node may send the MAC CE frame to a wireless communication device. The wireless communication device may send duplicated data via activated RLC entities indicated by the MAC CE frame.

In some embodiments, the uplink packet may include a general packet radio service (GPRS) tunneling protocol user plane (GTP-U) protocol data unit (PDU). In some embodiments, the downlink packet may include a general packet radio service (GPRS) tunneling protocol user plane (GTP-U) protocol data unit (PDU).

In some embodiments, the host RAN node may be a centralized unit (CU) comprising a CU user plane (CU-UP) and a CU control plane (CU-CP). The assisting RAN node with the host RAN node may establish a new radio unlicensed (NR-U) tunnel for the DRB. The CU-CP may send a request message to the CU-UP to setup or modify a resource of the DRB at the CU-UP. The request message may include one or more Cell Group Duplication Number Information. Each of the one or more Cell Group Duplication Number Information may be for a specific cell group of the DRB to indicate the number of PDCP duplication for this cell group and may include at least one of: a RLC number of the specific cell group, a UP transport layer address number of the specific cell group, a UP number of the specific cell group, a UP tunnel number of the specific cell group, a packet duplication number of the specific cell group, or an identifier of the specific cell group.

In some embodiments, the CU-UP may send a response message to the CU-CP. The response message may include a number of UP Transport Layer Information at the CU-UP and the identifier of the specific cell group. The number of UP Transport Layer Information of the specific cell group may be indicated by the one or more Cell Group Duplication Number Information for the specific cell group. Each of the UP Transport Layer Information may include a transport layer address and a GPRS tunneling protocol (GTP) tunnel endpoint identifier. In some embodiments, first UP Transport Layer Information for each cell group is for a primary path or a split secondary path for PDCP duplication.

At least one aspect is directed to a system, a method, an apparatus, or a computer-readable medium. A host radio access network (RAN) node hosting a packet data convergence protocol (PDCP) entity may send to an assisting RAN node, radio link control (RLC) activation information associated with a dedicated radio bearer (DRB) for uplink duplication. The host RAN node may cause the assisting RAN node to establish a medium control element (MAC) control element (CE) frame, according to the RLC activation information.

In some embodiments, the RLC activation information may be determined by the host RAN node and includes information on secondary RLC entities that are in at least one of active state or inactive state.

In some embodiments, the host RAN node may receive, from the assisting RAN node in an uplink packet, first information comprising at least one of: radio quality information of RLC entities at the assisting RAN node, or an identification of suggested RLC entities at the assisting node for the uplink duplication. The RLC activation information may be determined by the host RAN node according to the first information.

In some embodiments, the RLC activation information may include information on secondary RLC entities that are in at least one of active state or inactive state in all RAN nodes other than the assisting RAN node.

In some embodiments, the host RAN node may cause the assisting RAN node to determine information on secondary RLC entities that are in at least one of active state or inactive state in the assisting RAN node for uplink duplication. In some embodiments, the host RAN node may receive, from the assisting RAN node in an uplink packet, first information comprising at least one of: radio quality information of RLC entities at the assisting RAN node, or the information on secondary RLC entities that are in at least one of active state or inactive state in the assisting RAN node for uplink duplication.

In some embodiments, the host RAN node may send, to the assisting RAN node, the RLC activation information via a downlink packet. In some embodiments, when the RLC activation information includes information of all secondary RLC entities of the DRB, the host RAN node may cause the assisting RAN node to incorporate the RLC activation information into the MAC CE frame.

In some embodiments, when the RLC activation information only includes information of secondary RLC entities that are in at least one of active state or inactive state in all RAN nodes other than the assisting RAN node, the host RAN node may cause the assisting RAN node to determine information of secondary RLC entities that are in at least one of active state or inactive state in the assisting RAN node. In some embodiments, the host RAN node may cause the assisting RAN node to combine the information of secondary RLC entities that are in at least one of active state or inactive state in the assisting RAN node and the information of secondary RLC entities that are in active state or inactive state in other RAN nodes for the DRB, into combined information. In some embodiments, the host RAN node may cause the assisting RAN node to incorporate the combined information into the MAC CE frame.

In some embodiments, the host RAN node may cause the assisting RAN node to send the MAC CE frame to a wireless communication device. The wireless communication device may send duplicated data via activated RLC entities indicated by the MAC CE frame.

In some embodiments, the uplink packet may include a general packet radio service (GPRS) tunneling protocol user plane (GTP-U) protocol data unit (PDU). In some embodiments, the downlink packet may include a general packet radio service (GPRS) tunneling protocol user plane (GTP-U) protocol data unit (PDU).

In some embodiments, the host RAN node may be a centralized unit (CU) comprising a CU user plane (CU-UP) and a CU control plane (CU-CP). The assisting RAN node with the host RAN node may establish a new radio unlicensed (NR-U) tunnel for the DRB. The CU-CP may send a request message to the CU-UP to setup or modify a resource of the DRB at the CU-UP. The request message may include one or more Cell Group Duplication Number Information. Each of the one or more Cell Group Duplication Number Information may be for a specific cell group of the DRB and may include at least one of: a RLC number of the specific cell group, a UP transport layer address number of the specific cell group, a UP number of the specific cell group, a UP tunnel number of the specific cell group, or an identifier of the specific cell group.

In some embodiments, the CU-UP may send a response message to the CU-CP. The response message may include a number of UP Transport Layer Information at the CU-UP and the identifier of the specific cell group. The number of UP Transport Layer Information of the specific cell group may be indicated by the one or more Cell Group Duplication Number Information for the specific cell group. Each of the UP Transport Layer Information may include a transport layer address and a GPRS tunneling protocol (GTP) tunnel endpoint identifier. In some embodiments, first UP Transport Layer Information for each cell group as for a primary path or a split secondary path for PDCP duplication.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| BSR | Buffer Status Report |
| CG | Configured Grant |
| CN | Core Network |
| CP | Control Plane |
| CU | Centralized Unit |
| DC | Dual Connectivity |
| DCI | Downlink Control Information |
| DL | Down Link or Downlink |
| DU | Distributed Unit |
| GPRS | General Packet Radio Service |
| GTP-U | GPRS Tunneling Protocol U |
| MN | Master Node |
| NG | Next Generation |
| NR | New Radio |
| NR-U | NR User Plane |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QoS | Quality of Service |
| RA | Random Access |
| RAN | Random Access Network |
| RB | Resource Bearer |
| RE | Resource Element |
| RLC | Radio Link Control |
| RS | Reference Signal |
| RRC | Radio Resource Control |
| SDU | Service Data Unit |
| SN | Secondary Node |
| SRB | Signaling Radio Bearer |
| TNL | Transport Network Layer |
| UE | User Equipment |
| UL | Up Link or Uplink |
| UP | User Plane |

1. Mobile Communication Technology and Environment

Figure 1:
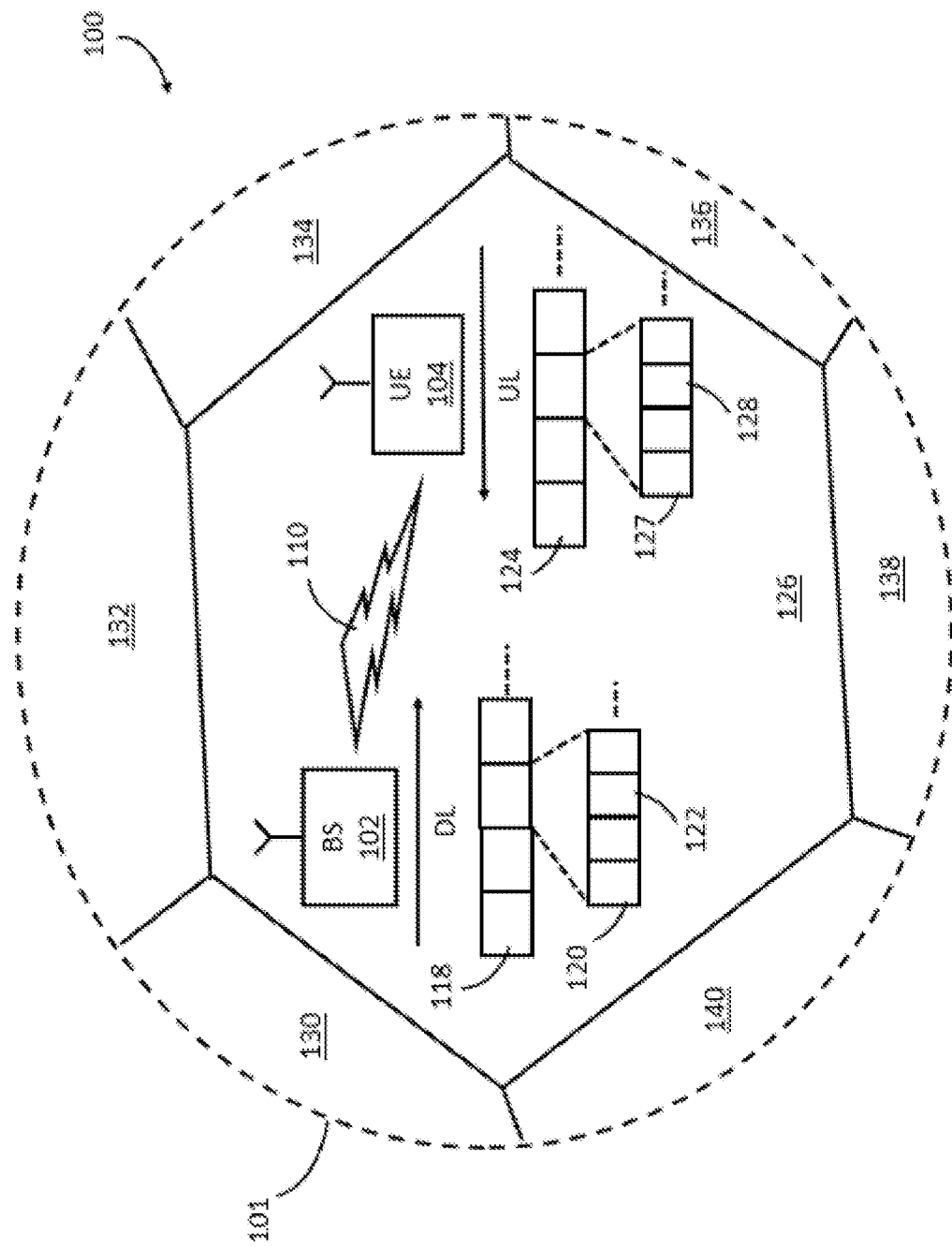
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
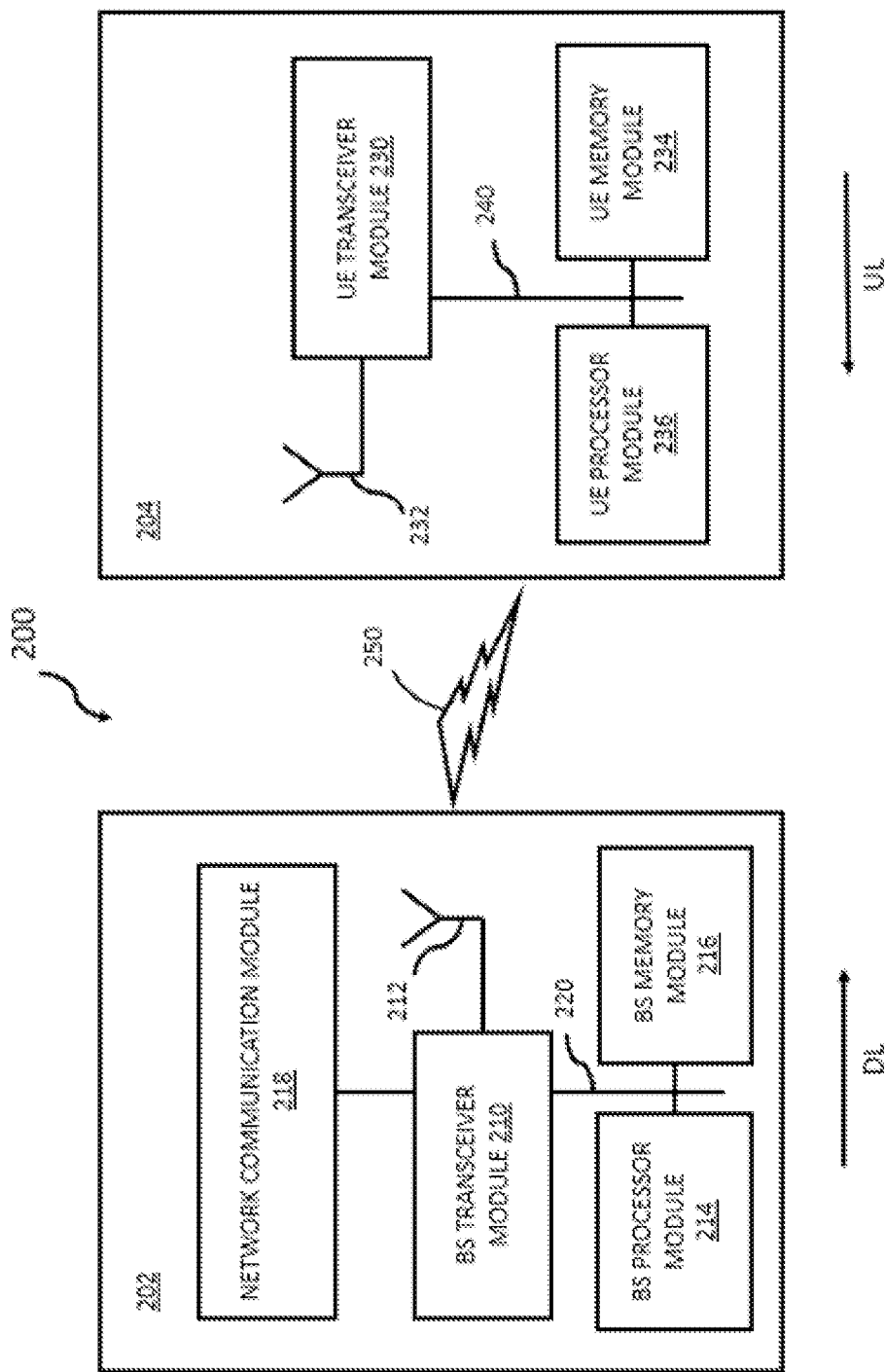
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Controlling Uplink Duplication in Packet Data Convergence Protocol Layer To ensure ultra-reliable low latency communications (uRLLC) over 5G wireless network, packet duplication functionality at the packet data convergence protocol (PDCP) layer may be used. When duplication is configured for a dedicated radio bearer (DRB) with more than two radio link control (RLC) entities associated with the PDCP entity, duplication at PDCP may include submitting the same PDCP protocol data units (PDUs) multiple times: once to each activated RLC entity for the radio bearer. With multiple independent transmission paths, packet duplication may increase reliability and reduces latency.

After the configuration, for the uplink (UL) duplication during the data transmission, the RAN network can dynamically control the PDCP duplication state (RLC activation state) of UE by means of a MAC control element sent to UE. A MAC CE can be used to dynamically control whether each of the configured secondary RLC entities for a DRB should be activated or deactivated. The configured primary RLC entity may be always activated. The UE may apply the received media access control (MAC) control element (CE) commands, and may transmit duplicated data to the RAN via activated RLC(s) indicated by MAC CE.

The MAC CE sent to UE may include activation states of all the secondary RLCs associated with the PDCP entity of the DRB. The secondary RLC entities of different cell groups may be located at different RAN nodes. However, under some approaches, without coordination between RAN nodes, each RAN node may not be able to construct the MAC CE with the activation states of all secondary RLCs of all cell groups.

To address and these other problems, the present systems and methods discussed herein may construct MAC CE with all secondary RLCs activation state of the DRB to dynamically control the UL duplication. The MAC CE sent to UE may include all secondary RLCs activation state associated with the PDCP entity of the DRB. The secondary RLC entities of different cell groups may be located at different RAN nodes. The node hosting PDCP, and the assisting node can transmit and receive user data traffic via NR-U tunnel (NR user plane tunnel) between node hosting PDCP and assisting node.

Figure 3:
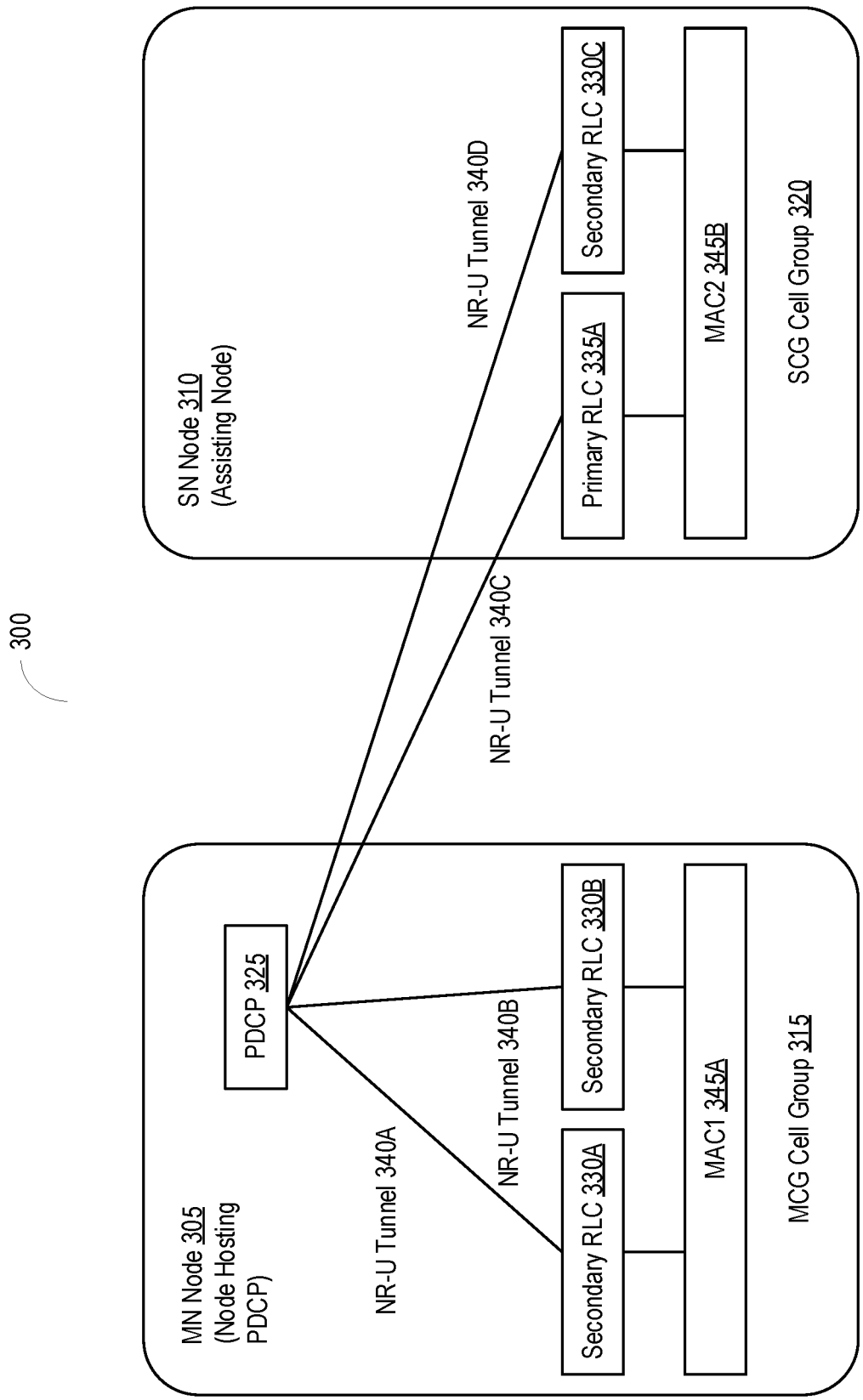
FIG. 3 illustrates a block diagram of a system for packet data convergence protocol (PDCP) duplication in a dual connectivity architecture in accordance with an illustrative embodiment.

Referring now to FIG. 3, depicted is a block diagram of a system 300 for packet data convergence protocol (PDCP) duplication in a dual connectivity architecture. The system 300 may include a master node (MN) 305 in a master cell group (MCG) 315 and a secondary node (SN) 310 in a secondary cell group (SCG) 320. The MN may include or host a PDCP entity 325. The MN 305 may also include secondary RLC entities 330A and 330B. The SN 310 may also include a primary RLC entity 335A and a secondary RLC entity 350C. The primary RLC entity 345A and the secondary RLC entities 330A-330C may be connected with the PDCP entity 325 via respective NR-U tunnels 340A—D. The second RLC entities 330A and 330B may be associated with the MAC entity 345A. The primary RLC entity 335A and the secondary RLC entity 330C may be associated with the MAC entity 345B. In the system 300, the secondary RLC entities 330A—C associated with the PDCP entity 325 of the MCG 315 and the SCG 320 may be located at the MN 305 and the SN 310 respectively. Under other approaches, neither MN 305 nor SN 310 may be able to construct the MAC CE with all secondary RLCs activation states (e.g., active and/or inactive states) of MCG 315 and SCG 320. This may be because each node may only fill in random values into MAC CE for secondary RLCs activation state of the other node. This may cause the UE to transmit duplicated data via incorrectly RLC entity.

Figure 4:
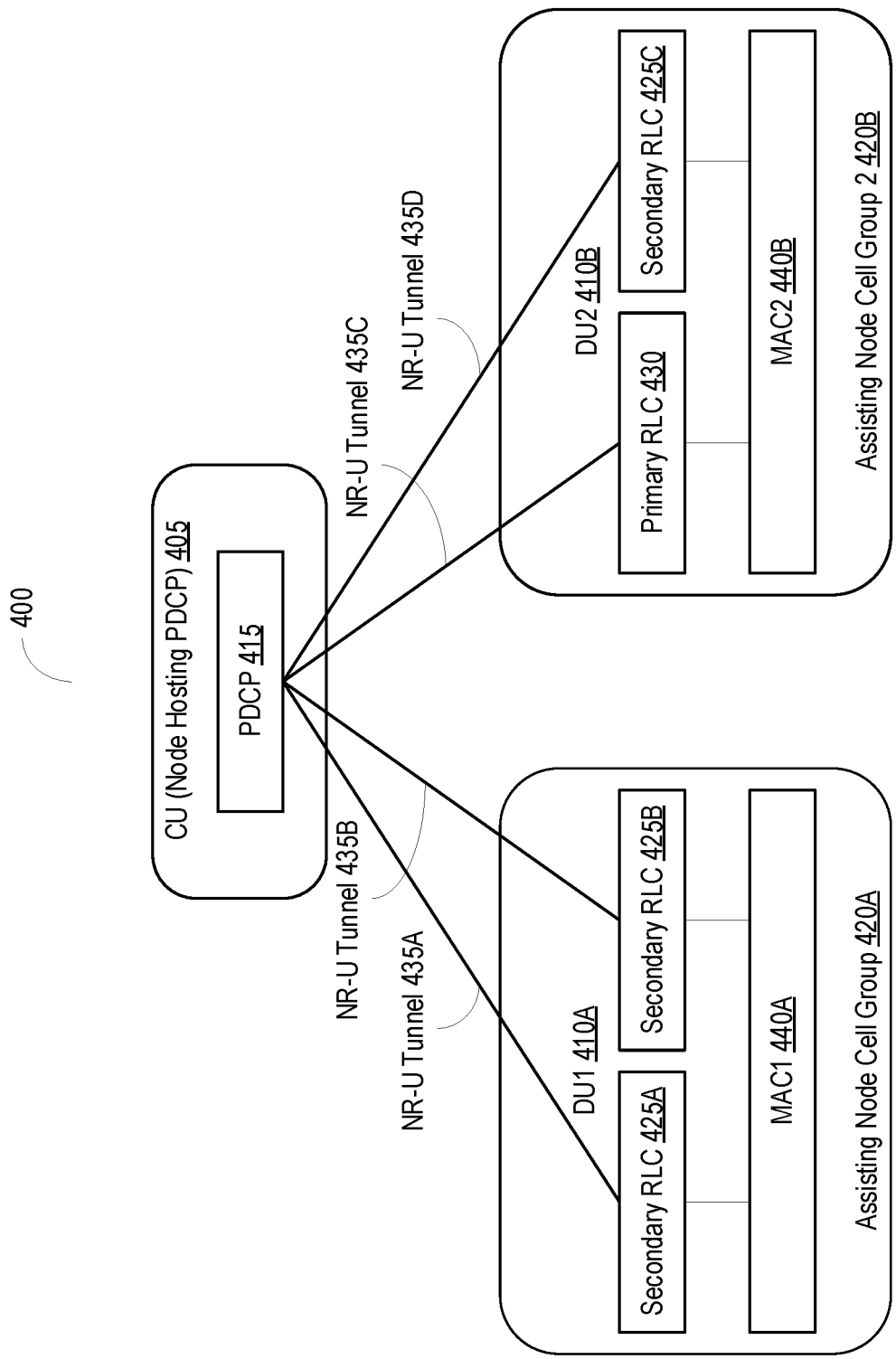
FIG. 4 illustrates a block diagram of a system for packet data convergence protocol (PDCP) duplication in a centralized unit (CU) and a distributed unit (DU) split architecture in accordance with an illustrative embodiment.

Referring now to FIG. 4, depicted is a block diagram of a system 400 for packet data convergence protocol (PDCP) duplication in a centralized unit (CU) and a distributed unit (DU) split architecture. The system 400 may include a centralized unit (CU) 405, a first distributed unit (DU) 410A, and a second DU 410B. The CU 405 may host a PDCP entity 415. The first DU 410A may be of an assisting node cell group 420A, and may include secondary RLC entities 425A and 425B. The secondary RLC entities 425A and 425B may be associated with MAC 440A. The second DU 410B may be of an assisting node cell group 420B, and may include a primary RLC entity 430 and a secondary RLC entity 425C. The primary RLC entity 430 and the secondary RLC entity 425C may be associated with MAC 440B. The primary RLC entity 430 and the secondary RLC entities 425A—C may be connected with the PDCP entity 415 via respective NR-U tunnels 435A—D. In the system 400, the secondary RLC entities 425A—C associated with the PDCP entity 415 of different cell groups 420A and 420B may be located at DU1 410A and DU2 410B respectively. Under other approaches, neither DU1 410A nor DU2 410B may not be able to construct the MAC CE with the activation states of all secondary RLC entities 425A—C of all cell groups 420 and 420B at DU1 410A and DU2 410B. This may be because each node may only fill in random values into MAC CE for secondary RLCs activation state of the other node. This may cause the UE to transmit duplicated data via incorrectly RLC entity.

Figure 5:
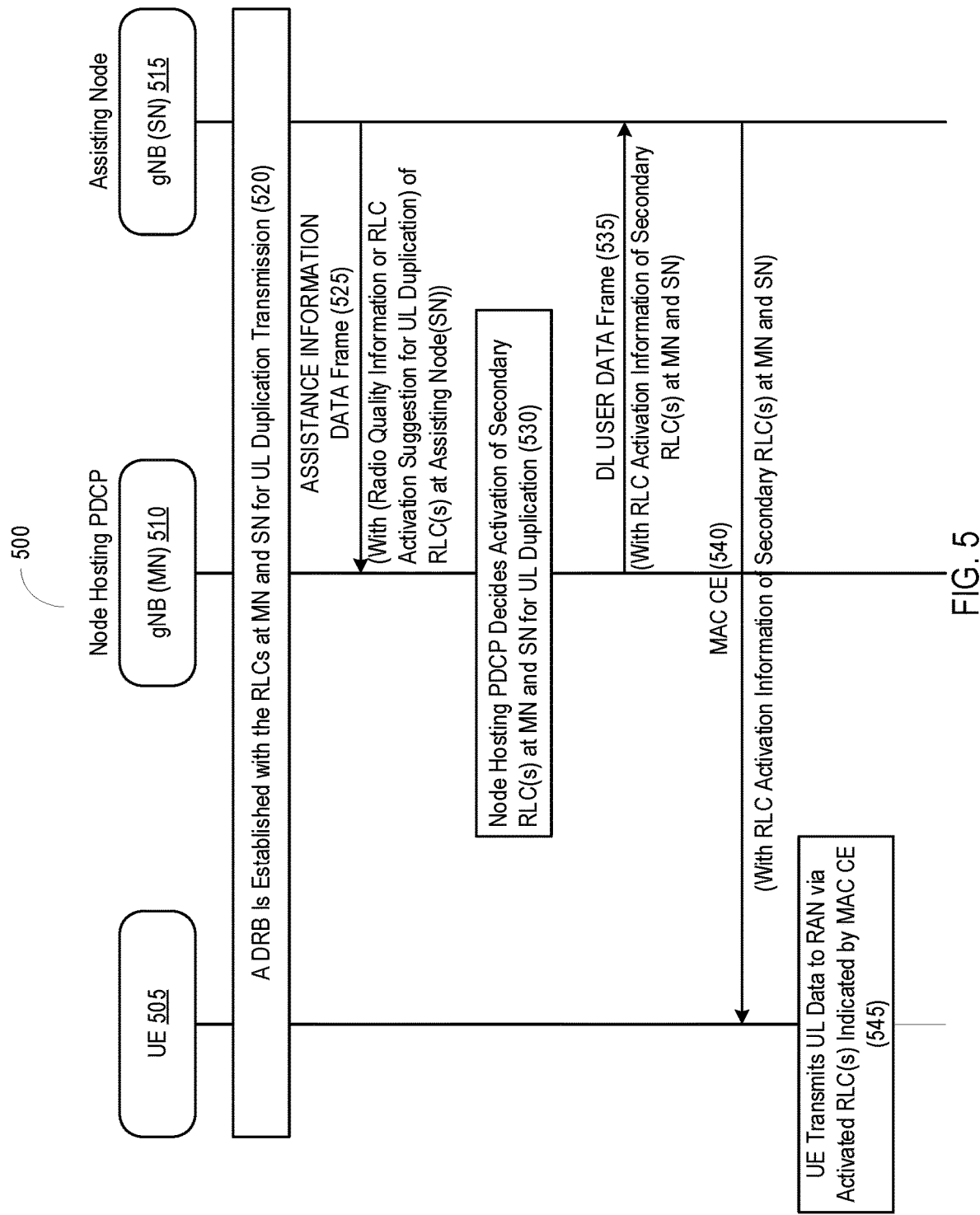
FIG. 5 illustrates a sequence diagram of a method of uplink (UL) duplication with a host node in dual connectivity architecture determining medium control element (MAC) control element (CE) in accordance with an illustrative embodiment.

Referring now to FIG. 5, depicted is a sequence diagram of an example method 500 of uplink (UL) duplication with a host node in dual connectivity architecture determining medium control element (MAC) control element (CE). Under method 500, a DRB may be established with the RLCs at both MN 510 and SN 515 for UL duplication transmission (520). The PDCP may be located at MN 510. The SN 515 may send uplink GTP-U PDU (e.g., ASSISTANCE INFORMATION DATA) to MN via NR-U tunnel between MN and SN (525). The uplink GTP-U PDU may include at least one of the following information: the radio quality information of the RLC(s) at assisting node (SN), and RLC activation suggestion of the RLC(s) at assisting node (SN) for UL duplication, among others.

The node hosting PDCP (MN 510) may decide or determine activation and/or deactivation (sometimes concisely referred to as "activation") states of all secondary RLC(s) of the DRB at MN 510 and SN 515 for UL duplication transmission (530). The decision may be based on the UL radio quality information of the RLC(s) at MN 510 and SN 515 and the RLC activation suggestion of the RLC(s) at MN 510 and SN 515 for UL duplication. The MN 510 may be aware of the information of its own node, and the MN 510 may be aware of the information of SN 515 by ASSISTANCE INFORMATION DATA sent by SN 515.

After decision, the node hosting PDCP (MN 510) may send a downlink GTP-U PDU (e.g., DL USER DATA) to SN 515 via NR-U tunnel between MN and SN (535). The GTP-U PDU may include RLC activation and/or deactivation information of all secondary RLC(s) of the DRB at MN 510 and SN 515 for UL duplication in GTP-U PDU. The assisting node (SN 515) may receive the RLC activation and/or deactivation information included in DL USER DATA into account for UL duplication, and may include the RLC activation and/or deactivation information into MAC CE frame. The SN 515 send MAC CE to UE 505 to inform RLC activation state to UE 505 (540). The UE 505 may apply the received MAC CE commands, and may transmit duplicated data to the RAN via activated RLC(s) indicated by MAC CE (545).

Figure 6:
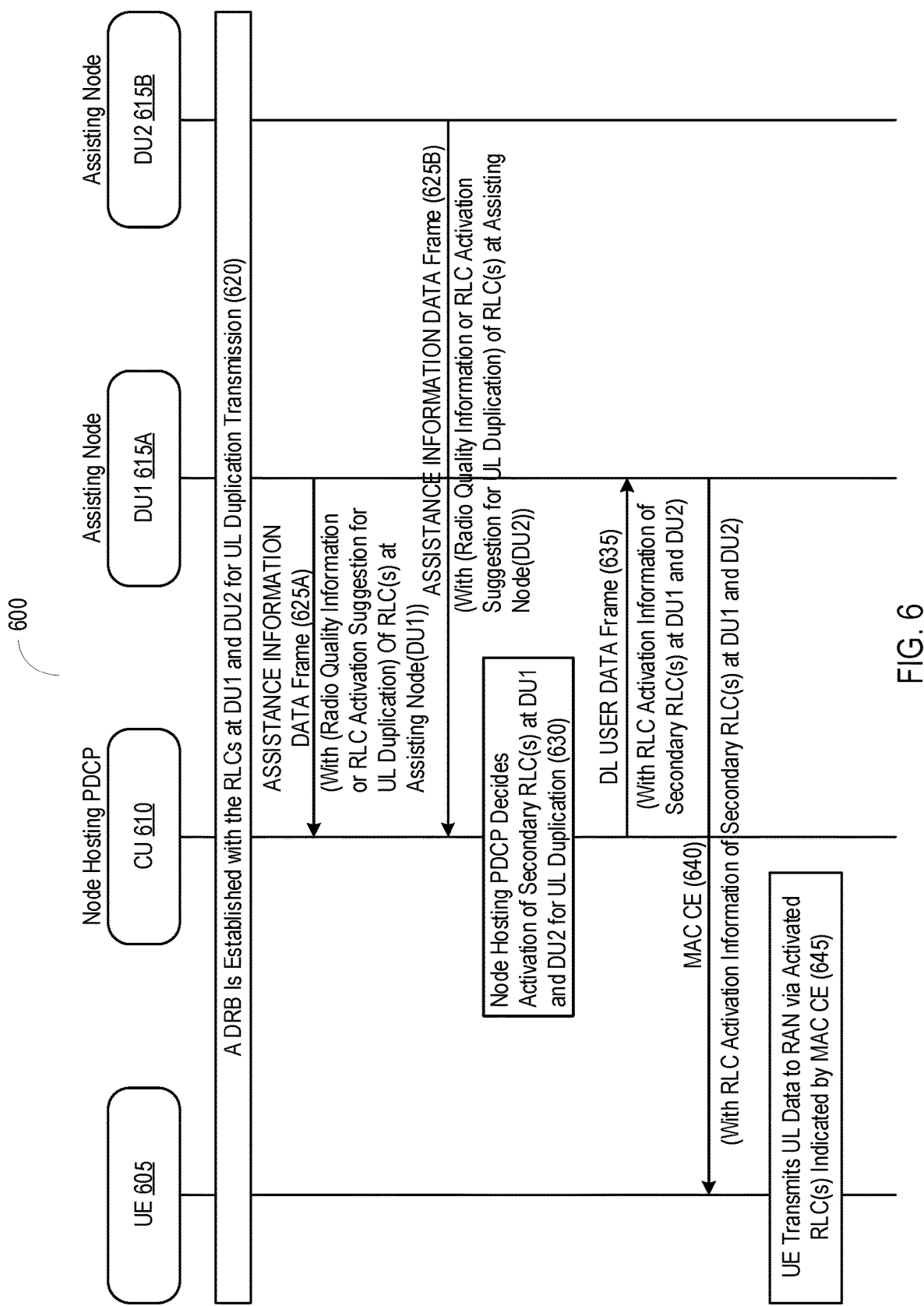
FIG. 6 illustrates a sequence diagram of a method of uplink (UL) duplication with a host node in a centralized unit (CU) and a distributed unit (DU) split architecture determining medium control element (MAC) control element (CE) in accordance with an illustrative embodiment.

Referring now to FIG. 6, depicted is a sequence diagram of a method 600 of uplink (UL) duplication with a host node in a centralized unit (CU) and a distributed unit (DU) split architecture determining medium control element (MAC) control element (CE). A DRB may be established with the RLCs at one or more DUs 615A and 615B for UL duplication transmission (620). The PDCP may be located at CU node 610. The assisting node (DU 615A and 615B) may send a uplink GTP-U PDU (e.g., ASSISTANCE INFORMATION DATA) to the CU 610 via NR-U tunnel between CU 610 and DU 615A and 615B (625A and 625B). The GTP-U PDU may include at least one of the following information: the radio quality information of the RLC(s) at assisting node (DU) and RLC activation suggestion of the RLC(s) at assisting node (DU) for UL duplication, among others.

The node hosting PDCP (CU 610) may receive ASSISTANCE INFORMATION DATA from one or more DUs 615A and 615B. The CU 610 may decide on the activation and/or deactivation (or active and/or inactive) states of all secondary RLC(s) of the DRB at all DU(s) for UL duplication transmission (630). The decision may be based on the UL radio quality information of the RLC(s) at all DU(s), and RLC activation suggestion of the RLC(s) at all DU(s) for UL duplication. The CU may be/become aware of the above information at DU, through the ASSISTANCE INFORMATION DATA sent by DU.

After the decision, the node hosting PDCP (CU 610) may send a downlink GTP-U PDU (e.g., DL USER DATA) to one or more DUs 615A and 615B (e.g., 615A as depicted) via NR-U tunnel between CU 610 and DU 615A or 615B (635). The GTP-U PDU may include RLC activation/deactivation information of all secondary RLC(s) of the DRB for UL duplication in GTP-U PDU. The assisting node (DU 615A or 615B) may receive the RLC activation and/or deactivation information included in DL USER DATA into account for UL duplication. The assisting node may include the RLC activation/deactivation information into MAC CE frame. The DU may send MAC CE to UE 605 to inform RLC activation state to UE 605 (640). The UE 605 may apply the received MAC CE commands, and transmit duplicated data to the RAN via activated RLC(s) indicated by MAC CE (645).

Figure 7:
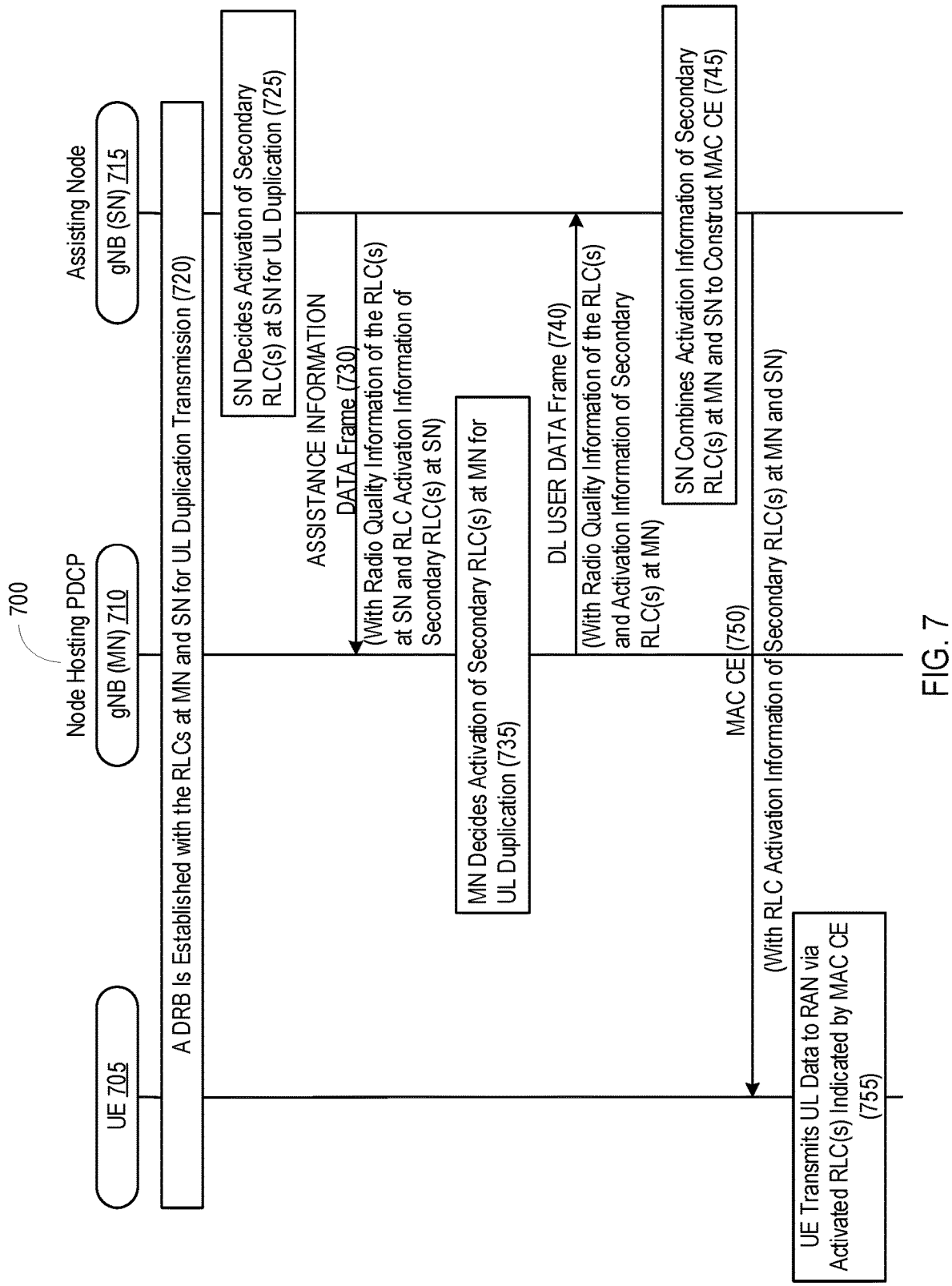
FIG. 7 illustrates a sequence diagram of a method of uplink (UL) duplication with an assisting node in dual connectivity architecture determining medium control element (MAC) control element (CE) in accordance with an illustrative embodiment.

Referring now to FIG. 7, depicted is a sequence diagram of a method 700 of uplink (UL) duplication with an assisting node in dual connectivity architecture determining medium control element (MAC) control element (CE). A DRB may be established with the RLCs at both MN 710 and SN 715 for UL duplication transmission (720). The PDCP may be located at MN 710. The assisting node (SN 715) may decide, specify or determine the activation and/or deactivation state of secondary RLC(s) at SN 715 for UL duplication transmission (725). After the decision, the assisting node (SN 715) may send uplink GTP-U PDU (e.g., ASSISTANCE INFORMATION DATA) to MN 710 via NR-U tunnel between MN 710 and SN 715 (730). The GTP-U PDU may include the following information: the radio quality information of the RLC(s) at assisting node (SN 715) and RLC activation information of the secondary RLC(s) at assisting node (SN 715) for UL duplication, among others.

The node hosting PDCP (MN 710) decides activation and/or deactivation state of secondary RLC(s) at MN 710 for UL duplication transmission (735). The MN 710 may obtain the following information into account in performing the decision: the radio quality information of the RLC(s) at other node (SN 715) and RLC activation information of the secondary RLC(s) at other node (SN 715) for UL duplication. After the decision, the node hosting PDCP (MN 710) may send a downlink GTP-U PDU (e.g., DL USER DATA) to SN 715 via NR-U tunnel between MN 710 and SN 715 (740). The GTP-U PDU may include RLC activation and/or deactivation information of secondary RLC(s) at MN 710 for UL duplication. In some embodiments, the GTP-U PDU may include the radio quality information of the RLC(s) at assisting node (MN 710).

The assisting node (SN 715) may obtain the RLC activation and/or deactivation information included in DL USER DATA into account for UL duplication, and may combine activation information of secondary RLC(s) at MN 710 and SN 715 to construct, generate or provide a MAC CE frame (745). The assisting node (SN 715) may include the RLC activation and/or deactivation information of all secondary RLC(s) of the DRB at MN 710 and SN 715 into the MAC CE frame. The SN 715 may send MAC CE to UE 705 to inform RLC activation state to UE 705 (750). The UE 705 may apply the received MAC CE commands (in the MAC CE frame), and transmit duplicated data to the RAN via activated RLC(s) indicated by the MAC CE frame (755).

Figure 8:
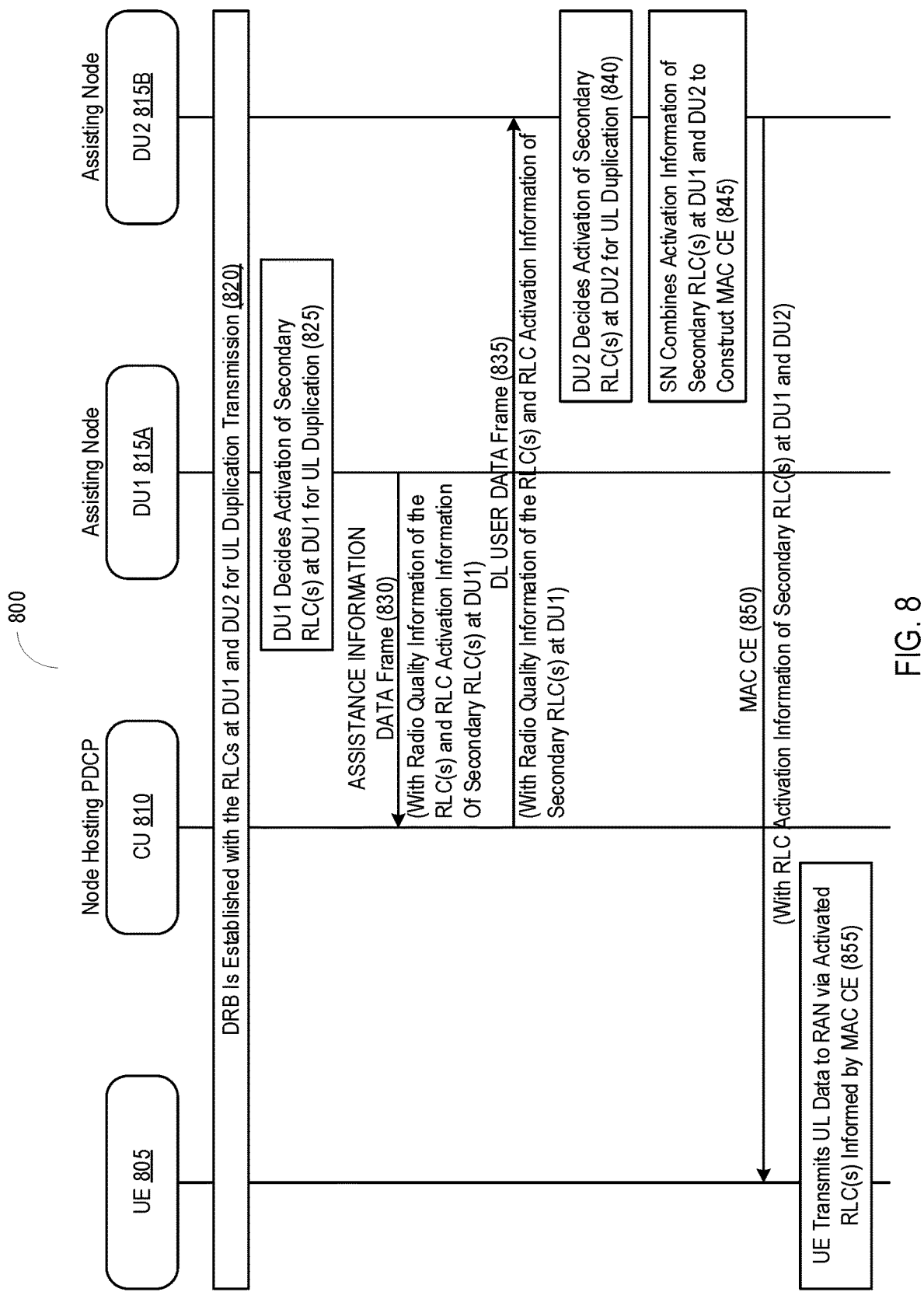
FIG. 8 illustrates a sequence diagram of a method of uplink (UL) duplication with an assisting node in a centralized unit (CU) and a distributed unit (DU) split architecture determining medium control element (MAC) control element (CE) in accordance with an illustrative embodiment.

Referring now to FIG. 8, depicted is a sequence diagram of a method 800 of uplink (UL) duplication with an assisting node in a centralized unit (CU) and a distributed unit (DU) split architecture for determining a medium control element (MAC) control element (CE). A DRB may be established with the RLCs at more than one or more DUs 815A and 815B for UL duplication transmission (820). The PDCP may be located at CU 810 node. The assisting node (DU1 815A) may decide the activation and/or deactivation state of secondary RLC(s) at DU1 815A for UL duplication transmission (825).

After decision, the assisting node (DU1 815A) sends uplink GTP-U PDU (e.g., ASSISTANCE INFORMATION DATA) to CU 810 via NR-U tunnel between CU 810 and DU1 815A (830). The GTP-U PDU may include the following information: the radio quality information of the RLC(s) at assisting node (DU1 815A) and RLC activation information of the secondary RLC(s) at assisting node (DU1 815A) for UL duplication, among others. The node hosting PDCP (CU 810) may send a downlink GTP-U PDU (e.g., DL USER DATA) to DU2 815B via NR-U tunnel between CU 810 and DU2 815B (8305), including RLC activation information of the secondary RLC(s) at DU1 815A for UL duplication in GTP-U PDU, optionally including the radio quality information of the RLC(s) at assisting node (DU1 815A) in GTP-U PDU.

DU2 815B may decide the activation and/or deactivation state of secondary RLC(s) at DU2 815B for UL duplication transmission (840). The DU2 815B may use or account for the following information in performing the decision: the radio quality information of the RLC(s) at other node (DU1 815A) and RLC activation information of the secondary RLC(s) at other node (DU1 815A) for UL duplication. The DU2 815B may combine the activation information of all secondary RLC(s) of the DRB at DU1 815A and DU2 815B to construct MAC CE (845), e.g., to generate or construct a MAC CE frame.

The DU2 815B may include the RLC activation and/or deactivation information of all secondary RLC(s) of the DRB at DU1 815A and DU2 815B into the MAC CE frame. The DU2 815B send the MAC CE frame to UE 805 to inform RLC activation state to UE 805 (850). The UE 805 may apply the received MAC CE commands (e.g., in the MAC CE frame), and transmit duplicated data to the RAN via activated RLC(s) indicated by the MAC CE frame (855).

Figure 9:
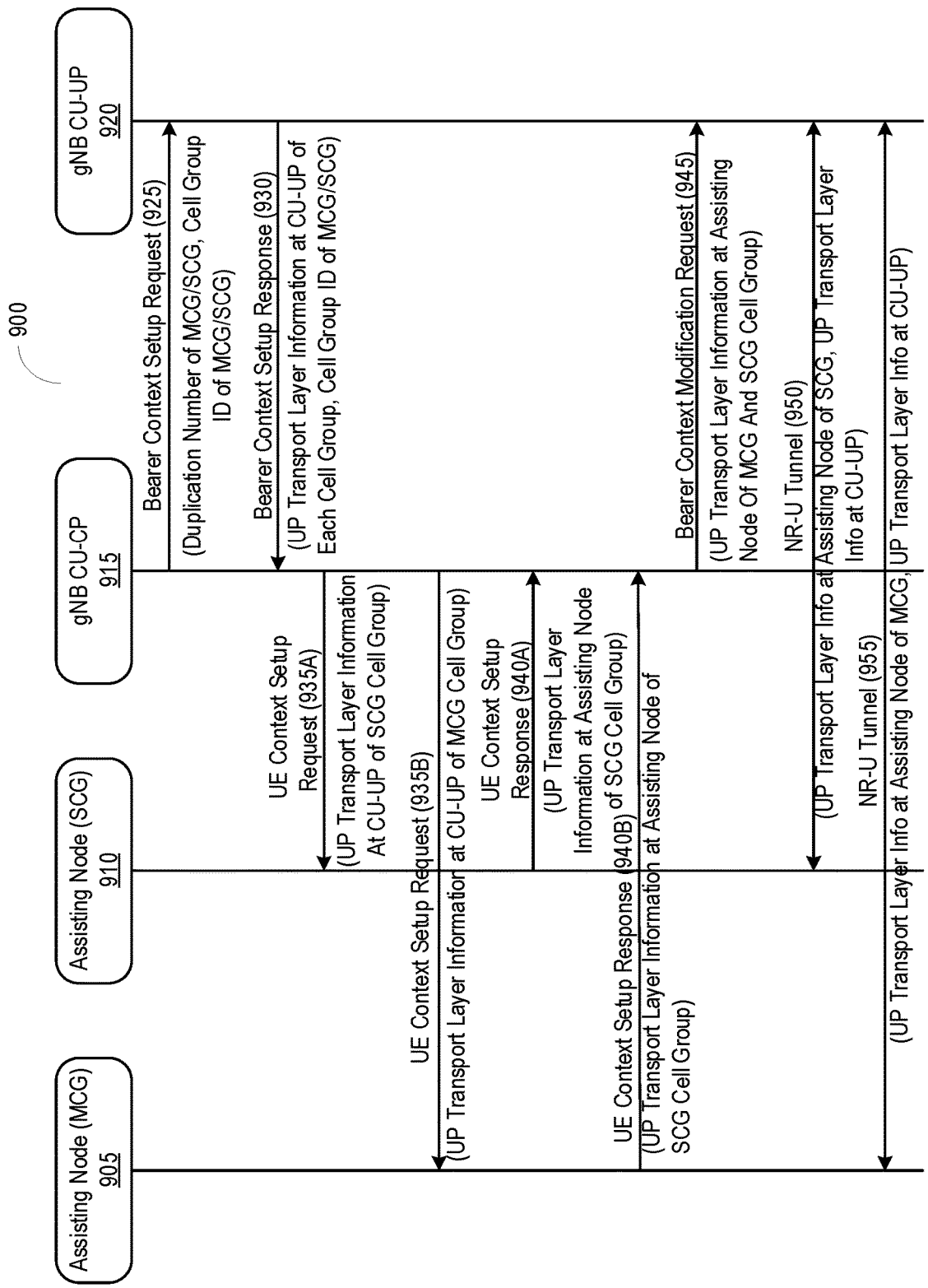
FIG. 9 illustrates a sequence diagram of a method of uplink (UL) duplication via a user plane tunnel between a hosting node and an assisting node in a centralized unit (CU) control plane (CP) and user plane (UP) architecture in an accordance with an illustrative embodiment.

Referring now to FIG. 9, depicted is a sequence diagram of a method 900 of uplink (UL) duplication via a user plane tunnel between a hosting node and an assisting node in a centralized unit (CU) control plane (CP) and user plane (UP) architecture. The CU-CP 915 may send a Bearer Context setup request message to CU-UP 920 (925). The message may include one or more Cell Group Duplication Number Information. Each Cell Group Duplication Number Information for a specific cell group of the DRB may be used to indicate the number of PDCP duplication for this cell group. Each Cell Group Duplication Number Information for a specific cell group of the DRB may include at least one of the following information: RLC number of the cell group, the UP Transport Layer address number of the cell group, UP number of the cell group, UP tunnel number of the cell group, the packet duplication number, and the corresponding cell group ID, among others. The Cell group ID may be used to distinguish different cell group. (e.g., 0=MCG cell group, 1=SCG cell group).

The CU-UP 920 may receive the Bearer Context setup request message. The CU-UP 920 may include the corresponding number of UP Transport Layer Information at CU-UP 920 and the cell group ID for a specific cell group in the Bearer Context setup response message. The number of UP Transport Layer Information of each cell group may be indicated by corresponding received Cell Group Duplication Number Information. Each UP Transport Layer Information contains the following information: a Transport Layer Address, a GTP Tunnel Endpoint Identifier. The CU-UP 920 may send Bearer Context setup response message to CU-CP 915 (930).

After receiving Bearer Context setup response message sent by CU-UP 920, the CU-CP 915 may be aware of the UP Transport Layer Information at CU-UP 920 for every cell group, and may consider the first UP Transport Layer Information for each cell group as for the primary path or the split secondary path for PDCP duplication. The CU-CP 915 can send a UE context setup request message to each assisting node hosting the cell group to convey UP Transport Layer Information at CU-UP 920 of the cell group (MCG 905 or SCG 910) to the assisting node (935A and 935B). The assisting node 905 or 910 may send a UE context setup response message to CU-CP 915 to inform UP Transport Layer Information of the cell group (MCG 905 or SCG 910) at the respective assisting node 905 or 910 (940A and 940B).

After receiving UE context setup response message from different assisting nodes configured in the MCG 905 or SCG 910, the CU-CP 915 may send a Bearer Context modification request message to CU-UP 920 to inform UP Transport Layer Information of all cell group (both MCG 905 and SCG 910) (950). The CU-UP 920 may be aware of the UP Transport Layer Information at assisting node, and the assisting node is aware of the UP Transport Layer Information at CP-UP. The user plane tunnel may be established between CU-UP 920 (PDCP hosting node) and assisting node (955). The CU-UP 920 and assisting node can transmit and receive user data traffic via such tunnel.

Figure 10:
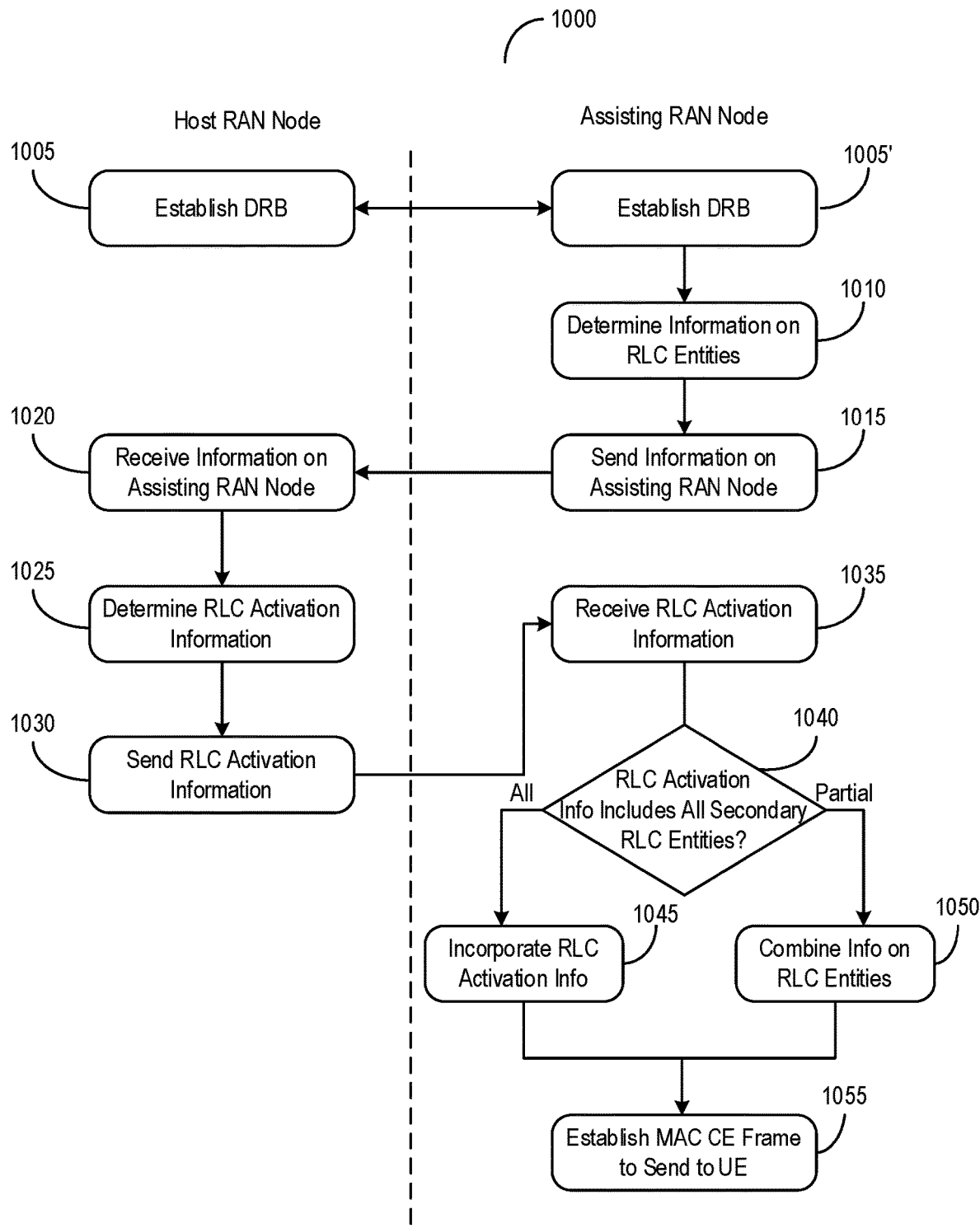
FIG. 10 illustrates a functional band diagram of a method of controlling uplink (UL) duplication in accordance with an illustrative embodiment.

Referring now to FIG. 10, depicted is a functional band diagram of a method 1000 of controlling uplink (UL) duplication. The method 1000 may be performed by or implemented using any of the components detailed herein in conjunction with FIGS. 1-9. In brief, an assisting RAN node and a host RAN node may establish a DRB (1005 and 1005'). The assisting RAN node determine information on RLC entities (1010). The assisting RAN node may send information on assisting RAN node (1015). A host RAN node may receive the information on assisting RAN node (1015). The host RAN node may determine RLC activation information (1020). The host RAN node may send RLC activation information (1025). The assisting RAN node may receive the RLC activation information (1030). The assisting RAN node may determine whether the RLC activation information includes all the secondary RLC entities (1035). If the RLC activation information is determined to include all, the assisting RAN node may incorporate the RLC activation information (1040). On the other hand, if the RLC activation information is determined to include partially, the assisting RAN node may combine the information on RLC entities (1045). The assisting RAN node may establish MAC CE frame to send to a UE (1050).

In further detail, an assisting RAN node and a host RAN node may set up or establish a DRB (1005 and 1005'). The DRB may be established with the RLC entities at the assisting RAN node and the host RAN node. Each RLC entity may be in an active state or an inactive state. The host RAN node may maintain, include, or otherwise host a PDCP entity. In some embodiments, the host RAN node may reside on a CU of a gNB and the assisting RAN node may reside on a DU of a gNB in a CU-DU split architecture. In some embodiments, the CU may include a CU-UP and a CU-CP.

In setting up or modifying a resource of the DRB, the CU-CP may transmit, provide, or send a request message to the CU-UP. The request message may identify or include one or more Cell Group Duplication Number Information. Each of the one or more Cell Group Duplication Number Information may be for a specific cell group of the DRB. Each of the one or more Cell Group Duplication Number Information may be used to indicate the number of PDCP duplication for this cell group. Each of the one or more Cell Group Duplication Number Information may identify or include a RLC number of the specific cell group, a UP transport layer address number of the specific cell group, a UP number of the specific cell group, a UP tunnel number of the specific cell group, a packet duplication number of the specific cell group, or an identifier of the specific cell group, among others. The RLC number of the specific cell group may identify or reference an RLC entity for the specific cell group. The UP transport layer address number may identify or include a network address (e.g., Internet Protocol (IP) address and a port number. The UP number of the specific ell group may identify or reference a user plane tunnel number. The packet duplication number may identify or reference a number for the duplication packet.

In response, the CU-UP may provide, transmit, or send a response message to the CU-CP. The response message may identify or include a number of UP transport layer information at the CU-UP and the identifier of the specific cell group. The number of UP transport layer information may be indicated by the one or more Cell Group Duplication Number Information for the specific cell group. The number of the UP Transport Layer Information may identify or reference the number of the transport bearer information. The UP Transport Layer Information, information element (IE) may identify a transport bearer associated with a DRB. Each of the UP Transport Layer Information may identify or include a transport layer address and a GPRS tunneling protocol (GTP) tunnel endpoint identifier. The transport layer address of the UP Transport Layer Information may be a network address (e.g., an IP address) to be used for the user plane transport. The IE of the UP Transport Layer Information may contain a transport layer address and the GTP tunnel endpoint identifier.

The CU-CP may consider the first UP Transport Layer Information for each cell group as for the primary path or the split secondary path for PDCP duplication. In some embodiments, the CU-UP may use or apply the UP Transport Layer Information to each corresponding cell group. In applying, the CU-UP may identify one of the UP Transport Layer Information as for the primary path and another of the UP Transport Layer Information as for the split secondary path for PDCP duplication. The primary path may correspond to a user plane transport of a cell group to be mainly used for PDCP duplication for primary RLC entity. The primary RLC entity may be always activated. The split secondary path may correspond to a user plane transport in other cell group to be used for fallback to split bearer operation. For example, all secondary RLC entities may be inactivated (with the PDCP duplication function switched off), and the PDCP entity may use primary path and split secondary path to transmit different packets.

The assisting RAN node may identify or determine information on RLC entities (1010). The assisting RAN node may host or include one or more RLC entities, such as at least one primary RLC entity and at least one secondary RLC entity. The assisting RAN node may determine the information on the secondary RLC entities in the assisting RAN node for uplink duplication. In some embodiments, the determination of the information may be in response to establishment of a DRB with the RLC entities between the host RAN node and the assisting RAN node for uplink duplication. For each secondary RLC entities, the assisting RAN node may identify the state of the secondary RLC entity as in the active state or in the inactive state.

In some embodiments, the assisting RAN node may identify or determine radio quality information of the RLC entities (e.g., primary and secondary RLC entities) at the assisting RAN node. The radio quality information may indicate performance of the RLC entity in the network (e.g., NR), such as data rate, throughput, packet loss, the radio quality of air interface, and jitter, among others. In some embodiments, the assisting RAN node may identify, select, or determine an identification of each suggested or potential RLC entity at the assisting RAN node for uplink duplication. The determination may be based on the radio quality information of the RLC entities at the assisting RAN node. For example, the assisting RAN node may select some of the RLC entities with better radio quality to recommend for activation, while identifying other RLC entities with worse radio quality as not to be recommend for activation. In some embodiments, the assisting RAN node may compare the radio quality information to a selection criterion to determine whether to select the RLC entity. The selection criterion may identify or define the radio quality at which to select the corresponding RLC entity for recommendation for activation.

The assisting RAN node may provide, transmit, or otherwise send information on assisting RAN node to the host RAN node (1015). In some embodiments, the assisting RAN node may send the information on the secondary RLC entities in the active state or inactive state in the assisting RAN node for uplink duplication. In some embodiments, the assisting RAN node may send the radio quality information of the RLC entities (including primary and secondary RLC entities) at the assisting RAN node. In some embodiments, the assisting RAN node may send the identification of each RLC entity at the assisting RAN node for the uplink duplication. One or more of the information may be sent from the assisting RAN node to the host RAN node via an uplink packet. In some embodiments, the uplink packet may be or include a GTP-U PDU.

The host RAN node may retrieve, identify, or otherwise receive the information on assisting RAN node (1020). In some embodiments, the host RAN node may receive the information on the secondary RLC entities in the active state or inactive state in the assisting RAN node for uplink duplication. In some embodiments, the host RAN node may receive the radio quality information of the RLC entities (including primary and secondary RLC entities) at the assisting RAN node. In some embodiments, the host RAN node may receive the identification of each RLC entity at the assisting RAN node for the uplink duplication.

The host RAN node may identify or determine RLC activation information (1025). According to the information received from the assisting RAN node, the host RAN node may determine the RLC activation information. The RLC activation information may include information on one or more secondary RLC entities of the DRB in the active state or inactive state. For example, the RLC activation information may specify, indicate, or identify which secondary RLC entities of the DRB are to be in the active state or in the inactive state for the uplink duplication transmission. In determining the RLC activation information, the host RAN node may select or identify states (e.g., active or inactive state) for one or more secondary RLC entities at the assisting RAN node based on the information received from the assisting RAN node. The information used to determine may include the radio quality of the RLC entities at the assisting RAN node and the identification of each suggested RLC entity provided by the assisting RAN node. The secondary RLC entities identified by the host RAN node may be the same or may differ from the suggested RLC entities provided by the assisting RAN node.

In some embodiments, the host RAN node may identify or determine the information on the RLC entities at the host RAN node and one or more assisting RAN nodes of the DRB (excluding the assisting node that provided the information). The information on the RLC entities at the host RAN node and the one or more assisting RAN node may also be used to determine the RLC activation information. In some embodiments, the RLC activation information may indicate, identify, or otherwise include information on secondary RLC entities in one or more RAN nodes other than the assisting RAN node. The RLC activation information may specify, indicate, or identify which secondary RLC entities at RAN nodes other than the assisting RAN node are to be in the active state or in the inactive state for the uplink duplication transmission. In some embodiments, the host RAN node may combine or add the RLC activation information for secondary RLC entities in RAN nodes other than the assisting node that provided the information with the RLC activation information for the secondary RLC entities at the assisting RAN node.

The host RAN node may provide, transmit, or otherwise send the RLC activation information to the assisting RAN node (1030). The RLC activation information may be associated with the DRB for uplink duplication. The RLC activation information may be sent from the host RAN node to the assisting RAN node via a downlink packet. In some embodiments, the downlink packet may be or include a GTP-U PDU. In some embodiments, the host RAN node may insert or include the active or inactive states of the secondary RLC entities at the assisting RAN node into the RLC activation information for transmission to the assisting node. In some embodiments, the host RAN node may insert or include the active or inactive states of secondary RLC entities at the other RAN nodes of the DRB into the RLC activation information for transmission.

The assisting RAN node may retrieve, identify, or receive the RLC activation information from the host RAN node (1035). In some embodiments, the assisting RAN node may receive the RLC activation information from the host RAN node via the downlink packet. In some embodiments, the RLC activation information received from the host RAN node may identify or include the active or inactive states of the secondary RLC entities at the assisting RAN node of the DRB. In some embodiments, the RLC activation information received from the host RAN node may identify or include the active or inactive states of secondary RLC entities at the other RAN nodes of the DRB.

The assisting RAN node may identify or determine whether the RLC activation information includes all the secondary RLC entities (1040). Upon receipt from the host RAN node, the assisting RAN node may parse the RLC activation information. In some embodiments, the assisting RAN node may parse the downlink packet to identify the RLC activation information. Based on the parsing of the RLC activation information, the assisting RAN node may determine whether the RLC activation information contains or includes information of all the secondary RLC entities of the DRB. When the RLC activation includes information of all the secondary RLC entities, the assisting RAN node may determine that the RLC activation includes information is whole. When the RLC activation includes information of the secondary RLC entities in one or more RAN nodes other than the assisting RAN node, the assisting RAN node may determine that the RLC activation is partial.

If the RLC activation information is determined to include all, the assisting RAN node may add or incorporate the RLC activation information (1045). The assisting RAN node may incorporate the RLC activation information into a MAC CE frame to be sent to the UE. The RLC activation information to added to the MAC CE may include the states (e.g., active or inactive) of the secondary RLC entities of the DRB. On the other hand, if the RLC activation information is determined to include partially, the assisting RAN node may add or combine the information on RLC entities (1050). To combine, the assisting RAN node may determine the information of RLC entities at the assisting RAN node (e.g., in the same manner as in (1010)). The information may indicate or identify the states (e.g., active or inactive) of the RLC entities at the assisting RAN node. With the determination, the assisting RAN node may combine the determined information of RLC entities at the assisting RAN node with the information of secondary RLC entities in other RAN nodes of the DRB that are provided by the host RAN node. The combined information may indicate or identify the states (e.g., active or inactive) of the RLC entities across all the RAN nodes of the DRB. The assisting RAN node may incorporate the combination information into the MAC CE.

The assisting RAN node may set up or establish a MAC CE frame to send to a UE (1055). In accordance with the RLC activation information, the assisting RAN node may establish the MAC CE frame. The established MAC CE frame may identify or include the RLC activation information of the RLC entities in the RAN nodes of the DRB. For example, the MAC CE frame may indicate the states (e.g., active or inactive) of the RLC entities across all the RAN nodes of the DRB. With the establishment, the assisting RAN node may provide, transmit, or send the MAC CE to the UE (also referred herein as a wireless communication device). Upon receipt, the UE may apply the specifications of the MAC CE frame in sending duplicated data. The UE may provide, transmit, or send duplicated data in accordance with the RLC activation information as indicated by the MAC CE frame. In some embodiments, the UE may send the duplicated data via the RLC entities indicated as active in the RLC activation information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
  receiving, by an assisting radio access network (RAN) node from a host RAN node hosting a packet data convergence protocol (PDCP) entity, radio link control (RLC) activation information associated with a dedicated radio bearer (DRB) for uplink duplication; and
  establishing, by the assisting RAN node, according to the RLC activation information, a medium control element (MAC) control element (CE) frame, to identify a state of each of secondary RLC entities of the DRB as in an active state or an inactive state.

2. The method of claim 1, wherein the RLC activation information is determined by the host RAN node and includes information on secondary RLC entities that are in at least one of active state or inactive state.

3. The method of claim 2, comprising sending, by the assisting RAN node to the host RAN node in an uplink packet, first information comprising at least one of: radio quality information of RLC entities at the assisting RAN node, or an identification of suggested RLC entities at the assisting node for the uplink duplication, wherein the RLC activation information is determined by the host RAN node according to the first information.

4. The method of claim 3, wherein the uplink packet comprises a general packet radio service (GPRS) tunneling protocol user plane (GTP-U) protocol data unit (PDU).

5. The method of claim 1, wherein the RLC activation information includes information on secondary RLC entities that are in at least one of active state or inactive state in all RAN nodes other than the assisting RAN node.

6. The method of claim 5, comprising:
determining, by the assisting RAN node, information on secondary RLC entities that are in at least one of active state or inactive state in the assisting RAN node for uplink duplication; and
sending, by the assisting RAN node to the host RAN node in an uplink packet, first information comprising at least one of: radio quality information of RLC entities at the assisting RAN node, or the information on secondary RLC entities that are in at least one of active state or inactive state in the assisting RAN node for uplink duplication.

7. The method of claim 1, comprising:
receiving, by the assisting RAN node from the host RAN node, the RLC activation information via a downlink packet; and
when the RLC activation information includes information of all secondary RLC entities of the DRB, incorporating, by the assisting RAN node, the RLC activation information into the MAC CE frame; and
when the RLC activation information only includes information of secondary RLC entities that are in at least one of active state or inactive state in all RAN nodes other than the assisting RAN node,
determining, by the assisting RAN node, information of secondary RLC entities that are in at least one of active state or inactive state in the assisting RAN node,
combining, by the assisting RAN node, the information of secondary RLC entities that are in at least one of active state or inactive state in the assisting RAN node and the information of secondary RLC entities that are in active state or inactive state in other RAN nodes for the DRB, into combined information, and
incorporating, by the assisting RAN node, the combined information into the MAC CE frame.

8. The method of claim 7, comprising:
sending, by the assisting RAN node, the MAC CE frame to a wireless communication device, wherein the wireless communication device sends duplicated data, generated by the uplink duplication, via activated RLC entities indicated by the MAC CE frame.

9. The method of claim 7, wherein the downlink packet comprises a general packet radio service (GPRS) tunneling protocol user plane (GTP-U) protocol data unit (PDU).

10. The method of claim 1, wherein the host RAN node is a centralized unit (CU) comprising a CU user plane (CU-UP) and a CU control plane (CU-CP), the method comprising:
establishing, by the assisting RAN node with the host RAN node, a new radio unlicensed (NR-U) tunnel for the DRB,
wherein the CU-CP sends a request message to the CU-UP to setup or modify a resource of the DRB at the CU-UP, the request message including at least one Cell Group Duplication Number Information, each of the at least one Cell Group Duplication Number Information for a specific cell group of the DRB to indicate a number of PDCP duplication for this cell group and includes at least one of: a RLC number of the specific cell group, a UP transport layer address number of the specific cell group, a UP number of the specific cell group, a UP tunnel number of the specific cell group, a packet duplication number based on the uplink duplication of the specific cell group, or an identifier of the specific cell group.

11. The method of claim 10, wherein the CU-UP sends a response message to the CU-CP, the response message including a number of UP Transport Layer Information at the CU-UP and the identifier of the specific cell group, wherein the number of UP Transport Layer Information of the specific cell group is indicated by the at least one Cell Group Duplication Number Information for the specific cell group, and each of the UP Transport Layer Information includes a transport layer address and a GPRS tunneling protocol (GTP) tunnel endpoint identifier.

12. The method of claim 11, wherein first UP Transport Layer Information for each cell group is for a primary path or a split secondary path for uplink duplication, specifically PDCP duplication.

13. An assisting radio access network (RAN) node comprising:
at least one processor configured to:
receive, via receiver from a host RAN node hosting a packet data convergence protocol (PDCP) entity, radio link control (RLC) activation information associated with a dedicated radio bearer (DRB) for uplink duplication; and
establish, according to the RLC activation information, a medium control element (MAC) control element (CE) frame to identify a state of each of secondary RLC entities of the DRB as in an active state or an inactive state.

14. The assisting RAN node of claim 13, wherein the RLC activation information is determined by the host RAN node and includes information on secondary RLC entities that are in at least one of active state or inactive state.

15. The assisting RAN node of claim 14, wherein the at least one processor is configured to send, via a transmitter to the host RAN node in an uplink packet, first information comprising at least one of: radio quality information of RLC entities at the assisting RAN node, or an identification of suggested RLC entities at the assisting node for the uplink duplication, wherein the RLC activation information is determined by the host RAN node according to the first information.

16. The assisting RAN node of claim 13, wherein the RLC activation information includes information on secondary RLC entities that are in at least one of active state or inactive state in all RAN nodes other than the assisting RAN node.

17. The assisting RAN node of claim 16, wherein the at least one processor is configured to:
determine information on secondary RLC entities that are in at least one of active state or inactive state in the assisting RAN node for uplink duplication; and
send, via the transmitter to the host RAN node in an uplink packet, first information comprising at least one of: radio quality information of RLC entities at the assisting RAN node, or the information on secondary RLC entities that are in at least one of active state or inactive state in the assisting RAN node for uplink duplication.

18. The assisting RAN node of claim 13, wherein the at least one processor is configured to:
receive, via the receiver from the host RAN node, the RLC activation information via a downlink packet; and when the RLC activation information includes information of all secondary RLC entities of the DRB, incorporating, by the assisting RAN node, the RLC activation information into the MAC CE frame; and when the RLC activation information only includes information of secondary RLC entities that are in at least one of active state or inactive state in all RAN nodes other than the assisting RAN node,
- determine information of secondary RLC entities that are in at least one of active state or inactive state in the assisting RAN node,
- combine the information of secondary RLC entities that are in at least one of active state or inactive state in the assisting RAN node and the information of secondary RLC entities that are in active state or inactive state in other RAN nodes for the DRB, into combined information, and
- incorporate the combined information into the MAC CE frame.

19. The assisting RAN node of claim 18, wherein the at least one processor is configured to:
- send, via the transmitter, the MAC CE frame to a wireless communication device, wherein the wireless communication device sends duplicated data via activated RLC entities indicated by the MAC CE frame.

20. A non-transitory computer readable storage medium storing instructions, which when executed by one or more processors can cause the one or more processors to:
- receive, via receiver from a host radio access network (RAN) node hosting a packet data convergence protocol (PDCP) entity, radio link control (RLC) activation information associated with a dedicated radio bearer (DRB) for uplink duplication; and
- establish, according to the RLC activation information, a medium control element (MAC) control element (CE) frame to identify a state of each of secondary RLC entities of the DRB as in an active state or an inactive state.

* * * * *